United States Patent
Nguyen

[19]
[11] Patent Number: 6,141,549
[45] Date of Patent: Oct. 31, 2000

[54] ROAMER PORT NOTIFICATION IN A RADIO TELECOMMUNICATIONS NETWORK

[75] Inventor: Thien Nguyen, Montreal, Canada

[73] Assignee: Telefonaktiebolaget L M Ericsson, Stockholm, Sweden

[21] Appl. No.: 09/173,131

[22] Filed: Oct. 15, 1998

[51] Int. Cl.[7] .............................. H04Q 7/20; H04M 3/42
[52] U.S. Cl. ..................... 455/433; 455/432; 455/414
[58] Field of Search ................................... 455/433, 432, 455/435, 414, 461, 406, 407, 408

[56] References Cited

U.S. PATENT DOCUMENTS

| | | | |
|---|---|---|---|
| 5,142,654 | 8/1992 | Sonberg et al. | 379/59 |
| 5,414,750 | 5/1995 | Bhagat et al. | 455/414 X |
| 5,440,614 | 8/1995 | Sonberg et al. | 379/60 |
| 5,513,247 | 4/1996 | Mukerjee et al. | 379/60 |
| 5,564,068 | 10/1996 | Nguyen | 455/433 |
| 5,913,165 | 6/1999 | Foti | 455/435 |
| 5,991,621 | 11/1999 | Alperovich | 455/433 |

*Primary Examiner*—Tracy Legree
*Attorney, Agent, or Firm*—Smith, Danamraj & Youst, P.C.

[57] ABSTRACT

A method in a radio telecommunications network of automatically providing a roamer port number to a calling party when a called roaming mobile station (MS) is in the calling party's exchange. A Roamer Port Notification (RPN) subscriber class is set in the roaming MS's home location register (HLR), and is used to activate a RPN feature. When the RPN feature is activated, the roamer port number for the visited mobile switching center (MSC) is sent to the HLR in either a Feature Request (FEATREQ) Invoke message or a Registration Notification (REGNOT) Invoke message. Thereafter, when the calling party initiates a call directed to the roaming mobile station, it is determined whether the RPN service is activated for the roaming MS, and whether the roaming mobile station is in the calling party's exchange. If so, the MSC makes an announcement informing the calling party that the roaming mobile station is roaming in the local service area of the calling party, and providing the calling party with the roamer port number for the MSC.

9 Claims, 2 Drawing Sheets

ROAMER PORT NOTIFICATION IN A RADIO TELECOMMUNICATIONS NETWORK

BACKGROUND OF THE INVENTION

1. Technical Field of the Invention

This invention relates to radio telecommunication networks and, more particularly, to a system and method in a radio telecommunications network for automatically providing a roamer port number to a calling party.

2. Description of Related Art

Existing radio telecommunications networks provide local service to subscribers that are operating in the service area of their own service provider. When a subscriber roams to another (visited) network, however, long distance charges may be incurred. For example, a subscriber in the 514 area code of Montreal may roam to the 905 area code of Toronto. At that time, if a calling subscriber in Montreal calls the roaming subscriber at his 514 number, the roaming subscriber has to pay long distance charges equivalent to the long distance charge from Montreal to Toronto. Likewise, if a calling subscriber in Toronto calls the roaming subscriber at his 514 number, the calling subscriber has to pay long distance charges even though both subscribers are currently located in the same exchange.

In order to avoid long distance charges when both subscribers are located in the same exchange, roamer ports are implemented in each exchange. In the example above, if the calling subscriber in Toronto is aware that the roaming subscriber from Montreal is currently in Toronto, the calling subscriber first dials a local roamer port number. He then gets another dial tone, and he dials the telephone number of the roaming subscriber. The call is billed as a local call rather than a long distance call.

However, the calling subscriber in Toronto must be informed that the Montreal subscriber is in Toronto. If the Montreal subscriber knows he is going to Toronto, he can look up the Toronto roamer port number in the roamer port directory and call the Toronto subscriber and tell him the roamer port number. This manual process is cumbersome, however, especially if the Montreal subscriber plans to communicate with a large number of subscribers in Toronto.

Although there are no known prior art teachings of a solution to the aforementioned deficiency and shortcoming such as that disclosed herein, U.S. Pat. No. 5,513,247 to Mukerjee et al. (Mukerjee) discusses subject matter that bears some relation to matters discussed herein. Mukerjee discloses a call-handling method that determines when a roaming subscriber is in the same exchange as a calling subscriber, and automatically connects the call through the roamer port in a manner that is transparent to the subscribers. No long distance charges are incurred, but neither of the subscribers is informed of this fact. Therefore, they think that long distance charges are being incurred, and may unnecessarily cut the call short. In addition, the calling subscriber is not informed of the location of the called subscriber.

Review of the foregoing reference reveals no disclosure or suggestion of a method such as that described and claimed herein. In order to overcome the disadvantage of existing solutions, it would be advantageous to have a method of automatically informing the calling party that a called roaming subscriber is in the same exchange, and providing the appropriate roamer port number to the calling subscriber so that long distance charges can be avoided. The present invention provides such a method.

SUMMARY OF THE INVENTION

The present invention is a method in a radio telecommunications network of automatically providing a roamer port number to a calling party when a called roaming mobile station is in the calling party's exchange. The method implements a Roamer Port Notification (RPN) service by setting a new RPN subscriber class in the roaming mobile station's subscriber profile. When a call from the calling party directed to the roaming mobile station is received in a visited mobile switching center/visitor location register (MSC/VLR), it is determined in a home location register (HLR) for the roaming mobile station, whether the RPN service is activated for the roaming MS. This is followed by determining whether the roaming mobile station is in the calling party's exchange, and making an announcement from the MSC/VLR to the calling party upon determining that the RPN service is activated for the roaming MS, and the roaming mobile station is in the calling party's exchange. The announcement includes the roamer port number for the MSC/VLR.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention implements a Roamer Port Notification (RPN) service which sends an announcement to the calling party informing the calling party that a called roaming MS is in the same exchange, and providing the appropriate roamer port number. The announcement is sent to the calling party when the calling party dials the long distance telephone number of the roaming MS, and the called MS is roaming in the calling party's exchange. A new RPN subscriber class is set in the HLR, and is used to activate the feature. When activated by the mobile subscriber, the roamer port number for the visited MSC is sent to the HLR in either a Feature Request (FEATREQ) Invoke message or a Registration Notification (REGNOT) Invoke message. Then, when a calling party originates a call to the roaming MS, the serving mobile switching center (MSC) for the calling party sends a Location Request (LOCREQ) Invoke message to the roaming MS's home location register (HLR). This triggers an announcement to the calling party stating that the roaming MS is roaming in the local service area of the calling party, and providing the roamer port number.

Figure 1:
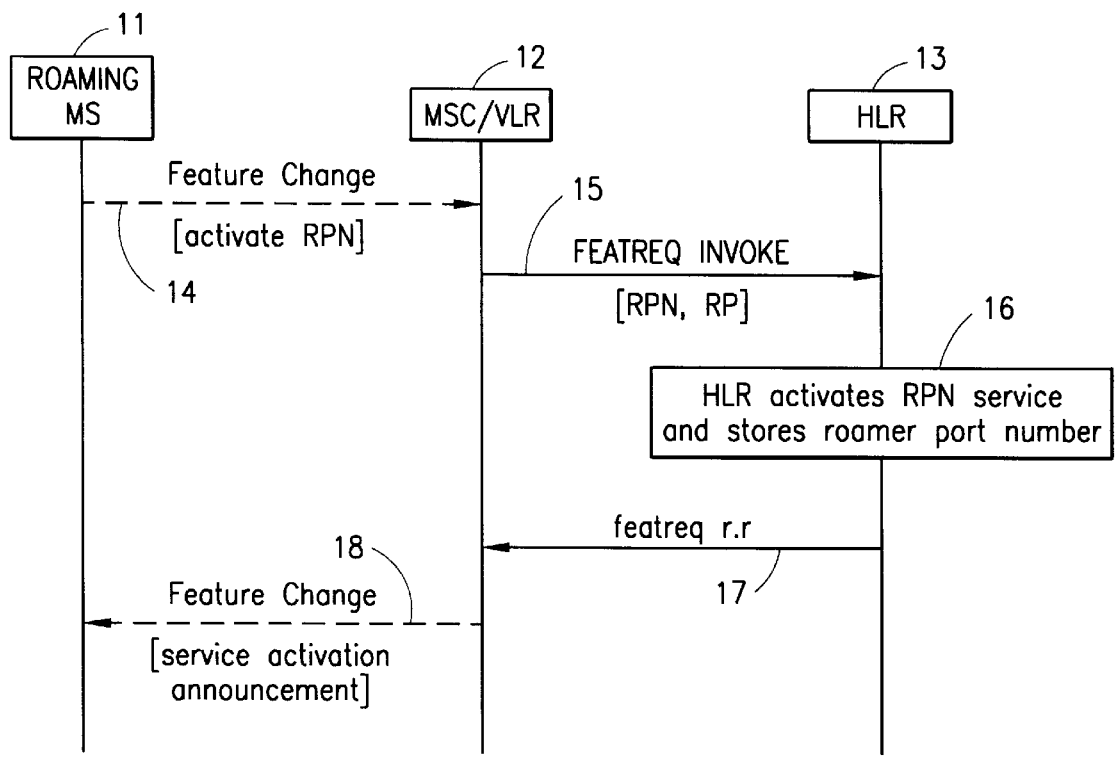
FIG. 1 is a message flow diagram illustrating the messages utilized to activate the Roamer Port Notification (RPN) service of the present invention.

FIG. 1 is a message flow diagram illustrating the messages utilized to activate the RPN service of the present invention. FIG. 1 illustrates messages between a roaming MS 11, its serving MSC/VLR 12, and its HLR 13. When the roaming subscriber desires to activate the RPN service, a feature change request 14 is sent from the roaming MS to the MSC/VLR requesting to activate the RPN service. The MSC/VLR sends a FEATREQ Invoke message 15 to the HLR and includes the RPN subscriber class and the roamer port number (RP) for the serving MSC. At 16, the HLR activates the RPN service and stores the roamer port number. The HLR then sends a Feature Request Return Result (featreq r.r.) message 17 back to the MSC/VLR. A service activation announcement 18 is then sent from the MSC/VLR to the roaming MS.

Figure 2:
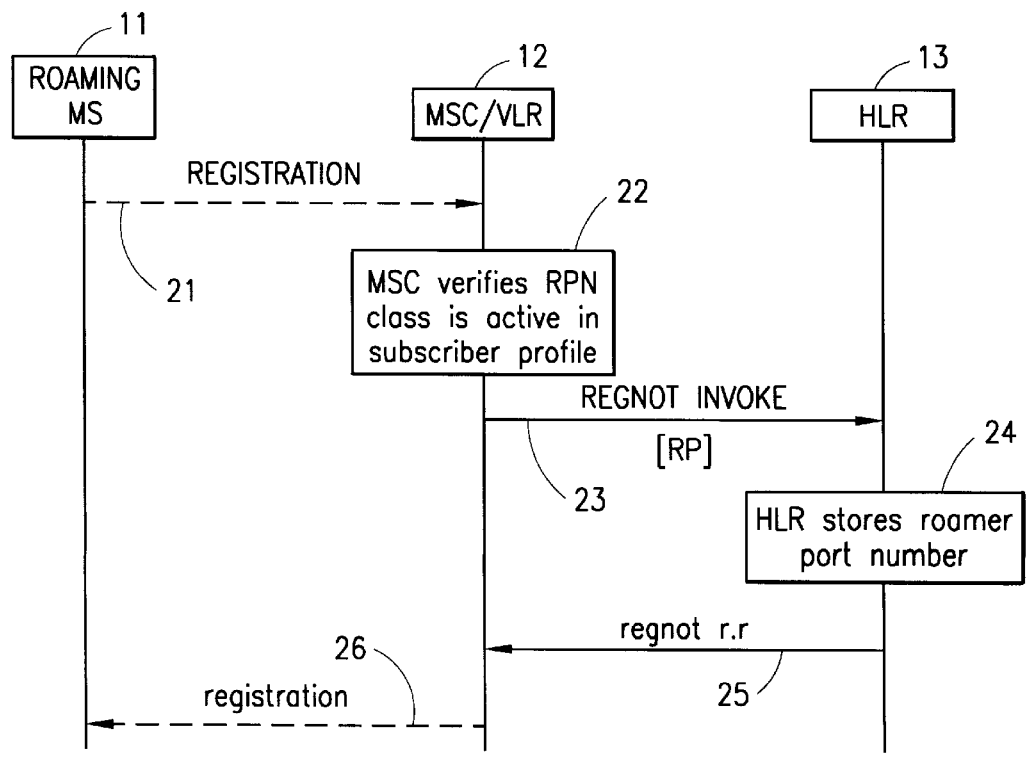
FIG. 2 is a message flow diagram illustrating the messages utilized to store the roamer port number in the roaming subscriber's home location register (HLR) upon registration of the roaming mobile station (MS)

FIG. 2 is a message flow diagram illustrating the messages utilized to store the roamer port number in the roaming MS's HLR upon registration of the roaming MS when the RPN service is activated. This procedure may be utilized at periodic registrations of the roaming MS in the MSC/VLR 12, or it may be utilized to update the roamer port number in the HLR when the roaming MS roams to a second MSC/VLR that utilizes a different roamer port number.

The roaming MS registers with the MSC/VLR at 21. The MSC verifies at 22 that the RPN class is active in the roaming MS's subscriber profile in the VLR. If the RPN class is active, the MSC/VLR includes the roamer port number (RP) in a REGNOT Invoke message 23 sent to the HLR. At 24, the HLR stores the roamer port number. The HLR then sends a Registration Notification Return Result (regnot r.r.) message 25 to the MSC/VLR which, in turn, acknowledges the registration to the roaming MS at 26.

Figure 3:
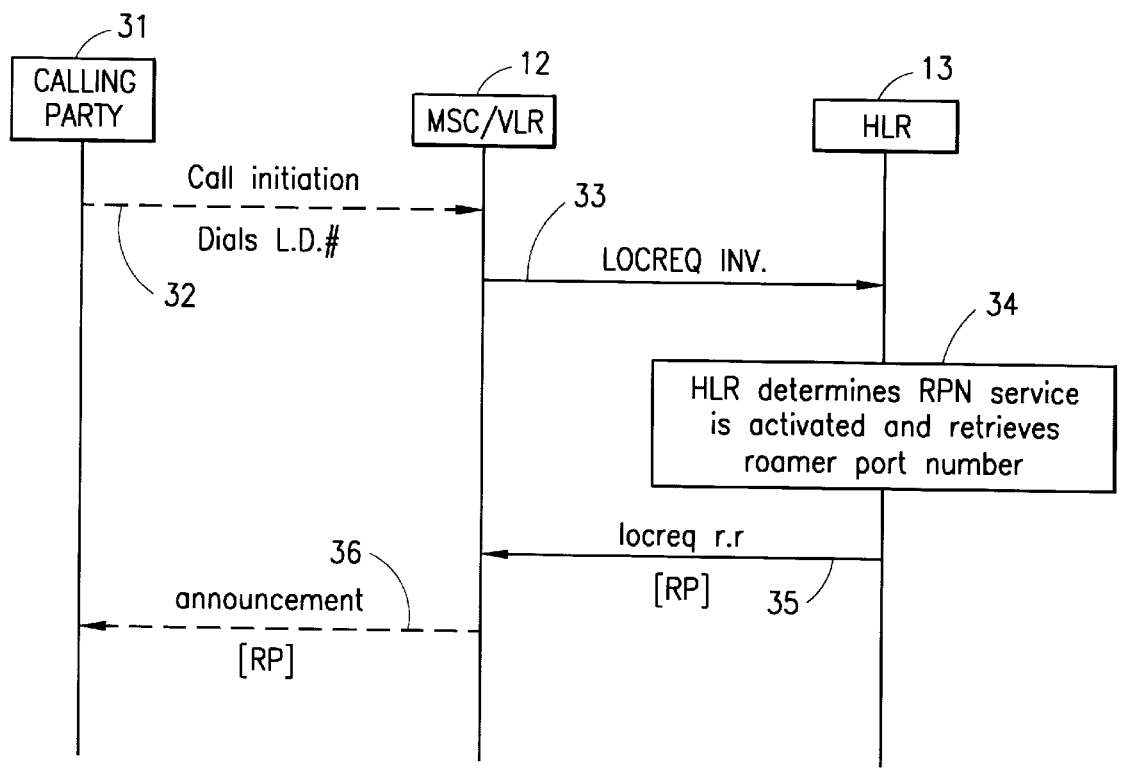
FIG. 3 is a message flow diagram illustrating the messages utilized to make a RPN announcement to the calling party.

FIG. 3 is a message flow diagram illustrating the messages utilized to make a RPN announcement to the calling party 31 when the RPN service has been activated, and the roaming MS 11 is in the same exchange as the calling party. At 32, the calling party initiates a call to the roaming MS by dialing the roaming MS's long distance telephone number. The MSC/VLR 12 sends a LOCREQ Invoke message 33 to the HLR 13 to determine the location of the roaming MS. When the HLR receives the LOCREQ Invoke message, the HLR determines that the RPN service is activated, and retrieves the stored roamer port number at 34. The HLR then sends a Location Request Return Result (locreq r.r.) message 35 to the MSC/VLR and includes the roamer port number (RP). The MSC then makes the RPN announcement 36 to the calling party stating that the roaming MS is roaming in the local service area of the calling party, and providing the roamer port number.

It is thus believed that the operation and construction of the present invention will be apparent from the foregoing description. While the method shown and described has been characterized as being preferred, it will be readily apparent that various changes and modifications could be made therein without departing from the scope of the invention as defined in the following claims.

What is claimed is:

1. In a radio telecommunications network, a method of automatically providing a roamer port number to a calling party when a called roaming mobile station is in the calling party's exchange, said method comprising the steps of:

receiving in a visited mobile switching center/visitor location register (MSC/VLR), a call from the calling party directed to the roaming mobile station;

determining in a home location register (HLR) for the roaming mobile station, whether a Roamer Port Notification (RPN) service is activated for the roaming MS;

determining whether the roaming mobile station is in the calling party's exchange; and making an announcement from the MSC/VLR to the calling party upon determining that the RPN service is activated for the roaming MS, and the roaming mobile station is in the calling party's exchange, said announcement including the roamer port number for the MSC/VLR.

2. The method of automatically providing a roamer port number to a calling party of claim 1 further comprising, before the step of receiving a call from the calling party directed to the roaming mobile station, the step of activating the RPN service by setting a RPN subscriber class in the roaming mobile station's subscriber profile.

3. The method of automatically providing a roamer port number to a calling party of claim 2 wherein the step of making an announcement also includes informing the calling party that the roaming mobile station is roaming in the local service area of the calling party.

4. In a radio telecommunications network, a method of automatically providing a roamer port number to a calling party when a called roaming mobile station is in the calling party's exchange, said method comprising the steps of:

sending a request from the roaming mobile station to a visited mobile switching center/visitor location register (MSC/VLR) requesting to activate a Roamer Port Notification (RPN) service;

sending a feature request message from the MSC/VLR to a home location register (HLR) for the roaming mobile station, said feature request message including a RPN subscriber class and a roamer port number for the MSC/VLR;

activating the RPN service in the HLR;

receiving in the MSC/VLR, a call from the calling party directed to the roaming mobile station; and making an announcement from the MSC/VLR to the calling party, said announcement including the roamer port number for the MSC/VLR, and wherein the step of making an announcement also includes informing the calling party that the roaming mobile station is roaming in the calling party's exchange.

5. The method of automatically providing a roamer port number to a calling party of claim 4 wherein the step of activating the RPN service in the HLR includes setting a RPN subscriber class in the roaming mobile station's subscriber profile.

6. The method of automatically providing a roamer port number to a calling party of claim 4 further comprising, after the step of receiving a call from the calling party directed to the roaming mobile station in the MSC/VLR, the steps of:

sending a location request message from the MSC/VLR to the HLR;

determining in the HLR that the RPN service is activated; and returning the roamer port number from the HLR to the MSC/VLR.

7. In a radio telecommunications network, a method of automatically providing a roamer port number to a calling party when a called roaming mobile station is in the calling party's exchange, said method comprising the steps of:

sending a request from the roaming mobile station to a first visited mobile switching center/visitor location register (MSC/VLR) requesting to activate a Roamer Port Notification (RPN) service;

sending a feature request message from the first MSC/VLR to a home location register (HLR) for the roaming mobile station, said feature request message including a RPN subscriber class and a roamer port number for the first MSC/VLR;

activating the RPN service in the HLR;

receiving in a second MSC/VLR, a registration message from the roaming mobile station;

verifying in the second MSC/VLR that the RPN service is active for the roaming mobile station;

sending a registration notification message from the second MSC/VLR to the HLR, said registration notification message including a roamer port number for the second MSC/VLR;

receiving in the second MSC/VLR, a call from the calling party directed to the roaming mobile station; and making an announcement from the second MSC/VLR to the calling party, said announcement including the roamer port number for the second MSC/VLR and wherein the step of making an announcement also includes informing the calling party that the roaming mobile station is roaming in the calling party's exchange.

8. The method of automatically providing a roamer port number to a calling party of claim 7 wherein the step of activating the RPN service in the HLR includes setting a RPN subscriber class in the roaming mobile station's subscriber profile.

9. The method of automatically providing a roamer port number to a calling party of claim 7 further comprising, after the step of receiving a call from the calling party directed to the roaming mobile station in the second MSC/VLR, the steps of:

sending a location request message from the second MSC/VLR to the HLR;

determining in the HLR that the RPN service is activated; and returning the roamer port number from the HLR to the second MSC/VLR.

* * * * *